US006137241A

United States Patent [19]
Gyoten

[11] Patent Number: 6,137,241
[45] Date of Patent: Oct. 24, 2000

[54] STARTING SWITCH CIRCUIT FOR A FLUORESCENT LAMP

[75] Inventor: Masayoshi Gyoten, Otsu, Japan

[73] Assignee: Matsushita Electric Industrial Co., Ltd., Japan

[21] Appl. No.: 08/903,893

[22] Filed: Jul. 31, 1997

[30] Foreign Application Priority Data

Aug. 8, 1996 [JP] Japan .................................... 8-210261

[51] Int. Cl.[7] ...................................................... H02M 1/12

[52] U.S. Cl. .......................... 315/360; 315/247; 315/219; 315/209 R

[58] Field of Search ........................ 315/209 R, 209 CD, 315/209 T, 200 A, 200 R, 205, 206, 207, 208, 241 S, 360, 225, 247, DIG. 7, 307, 219, 271, 224

[56] References Cited

U.S. PATENT DOCUMENTS

| | | | |
|---|---|---|---|
| 3,253,186 | 5/1966 | Rogers et al. | 315/225 |
| 3,663,860 | 5/1972 | Phillips | 315/205 |
| 3,676,734 | 7/1972 | Shimizu et al. | 315/219 |
| 3,753,040 | 8/1973 | Quenelle | 315/241 S |
| 3,889,153 | 6/1975 | Pierce | 315/209 R |
| 4,005,335 | 1/1977 | Perper | 315/224 |
| 4,812,736 | 3/1989 | Albach et al. | 315/DIG. 7 |
| 5,461,286 | 10/1995 | Hirschmann | 315/219 |
| 5,528,484 | 6/1996 | Hayashi | 363/47 |

OTHER PUBLICATIONS

Encyclopedia of Electronics, Stan Gibilisco, TAB Professional and Reference Books, p. 731, 1985.

*Primary Examiner*—Don Wong
*Assistant Examiner*—Wilson Lee
*Attorney, Agent, or Firm*—Sheridan Ross PC

[57] ABSTRACT

The present invention provides for a starting switch circuit which is generally applicable to ballasts and fluorescent lamps having different normal rated power from each other. A starting switch circuit includes a serially-connected circuit having a first rectifier circuit, a semiconductor switching element including a control terminal, and a first resistor circuit for detecting a current flowing to the semiconductor switching element, all connected in series; a first timer circuit, connected in parallel to a series circuit of the semiconductor switching element and the first resistor circuit, for switching the semiconductor switching element to OFF state after the semiconductor switching element is in ON state for a predetermined period of time; and a control circuit for controlling the semiconductor switching element.

12 Claims, 6 Drawing Sheets

STARTING SWITCH CIRCUIT FOR A FLUORESCENT LAMP

BACKGROUND OF THE INVENTION

The present invention relates to a fluorescent lamp lighting device, and more particularly, to a starting switch circuit using a semiconductor switching element for a fluorescent lamp which includes warm-up type electrodes.

A conventional starting switch circuit for a fluorescent lamp lighting device was primarily a glow starter. However, a glow starter has problems such as a long time needed for starting and a short lifetime. Although starting switch circuits using a semiconductor switching element have been developed, such starting switch circuits are expensive and met by only a limited demand. Therefore, development of an inexpensive starting switch circuit has been demanded. In a prior art, use of a transistor as a semiconductor switching element as shown in FIG. 6 is proposed (Japanese Patent Application Laid-Open Gazette No. 3-252096).

A circuit of a conventional fluorescent lamp lighting device shown in FIG. 6 comprises an a.c. power source 1, a ballast 2, a fluorescent lamp 3 including a pair of warm-up type electrodes 4, 5, a noise suppression capacitor 6, and a starting switch circuit 7. The circuit configuration of the fluorescent lamp lighting device is as follows. One end of the ballast 2 is connected to the a.c. power source 1. The other end of the ballast 2 is connected to a power source side terminal of the electrode 4 of the fluorescent lamp 3. The starting switch circuit 7 and the noise suppression capacitor 6 are connected between starting switch circuit side terminals of the electrodes 4, 5 of the fluorescent lamp 3.

Intra-circuit configuration of the starting switch circuit 7 which is connected between the starting switch circuit side terminals of the electrodes 4, 5 of the fluorescent lamp 3 is as follows. A first rectifying element 8, a resistor 30 and the collector and the emitter of a transistor 31 are connected in series between the starting switch circuit side terminals of the electrodes 4, 5 of the fluorescent lamp 3. A resistor 32 is connected between a connection point between the first rectifying element 8 and the resistor 30 and the base of the transistor 31. A timer circuit, which is formed by connecting a resistor 37 and a capacitor 36 in series to each other, is connected between the first rectifying element 8 and the starting switch circuit side terminal of the electrode 5. A thyrister 33 which is controlled by the timer circuit is connected between the base and the emitter of the transistor 31. A series circuit comprising a resistor 34 and a Zener diode 35 is connected between a connection point between the capacitor 36 and the resistor 37 and the gate of the thyrister 33.

Next, an operation of the conventional fluorescent lamp lighting device will be described.

The a.c. power source 1 is turned on. During a positive cycle of a power source voltage upon turning on of the a.c. power source 1, a base current is supplied to the base of the transistor 31 through the first rectifying element 8 and the resistor 32. Since the base current is supplied to the base of the transistor 31, a collector current flows between the collector and the emitter of the transistor 31 through the first rectifying element 8 and the resistor 30. A half-wave warm-up current flows in this manner, and therefore, the electrodes 4, 5 of the fluorescent lamp 3 are warmed up. At the same time, a reverse voltage is applied across the Zener diode 35. When the reverse voltage reaches a predetermined value (hereinafter "Zener voltage"), a current starts flowing in a reverse direction. As used herein, the phrase "becomes to ON state" refers to a device conducting, or being in an "ON" state. A charge accumulated in the capacitor 36 flows to the gate of the thyrister 33 through the Zener diode 35 and the resistor 34, so that the thyrister 33 becomes to ON state, and a current accordingly flows between the anode and the cathode of the thyrister 33. As used herein, the phrase "becomes to OFF state" refers to a device being non-conductive, or being in an "OFF" state. Therefore, the current which has been flowing to the base of the transistor 31 stops flowing, whereby the transistor 31 becomes to OFF state. As a result, a kick voltage due to an inductance of the ballast 2 is generated, and the fluorescent lamp 3 is ignited.

In the starting switch circuit which is used for the conventional fluorescent lamp lighting device, an operation of the timer circuit is determined by the sum of a voltage between the collector and the emitter of the transistor 31 and a voltage across the resistor 30. The voltage between the collector and the emitter of the transistor 31 and the voltage across the resistor 30 are influenced by the warm-up current which flows between the collector and the emitter of the transistor 31, and an operation time of the timer circuit is also changed accordingly.

In the case of a low power fluorescent lamp lighting device using the ballast 2 which has a large inductance, the operation time of the timer circuit is long since the warm-up current is small. In the worse situation, the voltage charged up the capacitor 36 of the timer circuit stabilizes at a low voltage. If this occurs, a current does not flow to the gate of the thyrister 33 and the warm-up current keeps flowing continuously. This leads to heating up of the ballast 2 and blackening of the both ends of the fluorescent lamp 3, which in turn makes it impossible to ignite the fluorescent lamp 3. Further, the voltage of the a.c. power source 1 decreases instantaneously during burning of the fluorescent lamp 3. And therefore, upon recovering of the voltage after the fluorescent lamp 3 went off, the thyrister 33 remains in ON state because of the gate current from the a.c. power source 1 and the capacitor 36. The operation, as mentioned above, is not executed and the fluorescent lamp 3 remains off since the transistor 31 remains in OFF state, and hence, it is impossible to ignite the fluorescent lamp 3 unless a switch of the a.c. power source 1 is operated once again.

BRIEF SUMMARY OF THE INVENTION

The present invention aims at solving the problems described above, and therefore, at providing for a starting switch circuit which is generally applicable to ballasts and fluorescent lamps having different normal rated power from each other as well as a starting switch circuit which automatically turns on a fluorescent lamp upon going off of the lamp due to an instantaneous low voltage at a power source.

A starting switch circuit according to the present invention comprises:

- a serially-connected circuit having first rectifying means, a semiconductor switching element including a control terminal, and first resistor means for detecting a current flowing to the semiconductor switching element, all connected in series;
- first timer means, connected in parallel to a series circuit of the semiconductor switching element and the first resistor means, for switching the semiconductor switching element to OFF state after the semiconductor switching element is in ON state for a predetermined period of time; and
- control means which controls the semiconductor switching element.

According to the present invention, since the starting switch circuit comprises the first timer means and the control means, the same starting switch circuit is applicable to fluorescent lamp lighting devices comprising ballast and fluorescent lamp which have different normal rated power from each other. Further, in the case that the starting switch circuit according to the present invention is applied to a fluorescent lamp lighting device, the fluorescent lamp lighting device automatically ignites a fluorescent lamp again after the lamp goes off.

The first timer means forming the starting switch circuit according to the present invention comprises second resistor means, at least one Zener diode, rectifying means and a capacitor which are connected in series to each other.

According to the present invention, it is possible to obtain the first timer means of a starting switch circuit which is used for fluorescent lamp lighting devices comprising ballast and fluorescent lamp having different normal rated power from each other and which automatically ignite a fluorescent lamp again after the fluorescent lamp goes off.

The semiconductor switching element forming the starting switch circuit according to the present invention is a field effect transistor.

According to the present invention, use of the field effect transistor makes it unnecessary to use a surge voltage suppression element for protecting the semiconductor switching element. Further use of the field effect transistor makes it possible to control ON state and OFF state of the semiconductor switching element by a voltage signal.

The control means forming the starting switch circuit according to the present invention comprises second timer means maintaining the semiconductor switching element in OFF state after a predetermined period of time in the case that operation for making the semiconductor switching element to ON state is repeated.

According to the present invention, it is possible to protect the semiconductor switching element forming the starting switch circuit. In addition, in the case that the starting switch circuit according to the present invention is applied to a fluorescent lamp lighting device, the fluorescent lamp lighting device stops ignition of the lamp again after a predetermined period of time and accordingly prevents flickering of the lamp.

The starting switch circuit according to the present invention is contained in a container which is interchangeable with a conventional glow starter of a fluorescent lamp apparatus.

According to the present invention, it is possible to use a socket for a glow starter switch of a conventional fluorescent light as a container for containing the starting switch circuit.

A fluorescent lamp lighting device according to the present invention comprises:

- an a.c. power source;
- a ballast connected at its one end to one end of the a.c. power source;
- a fluorescent lamp with warm-up electrodes connected to its one terminal to the other end of the ballast and at its another terminal to the other end of the a.c. power source; and
- a starting switch circuit as mentioned-above connected at its one end to still another terminal of the fluorescent lamp and at the other end thereof to still another terminal of the fluorescent lamp.

According to the present invention, it is possible to obtain a fluorescent lamp lighting device which incorporates the starting switch circuit the present invention.

DETAILED DESCRIPTION OF THE INVENTION

In the following, an Embodiment of the present invention will be described with reference to FIG. 1.

Circuit Configuration

Figure 1:
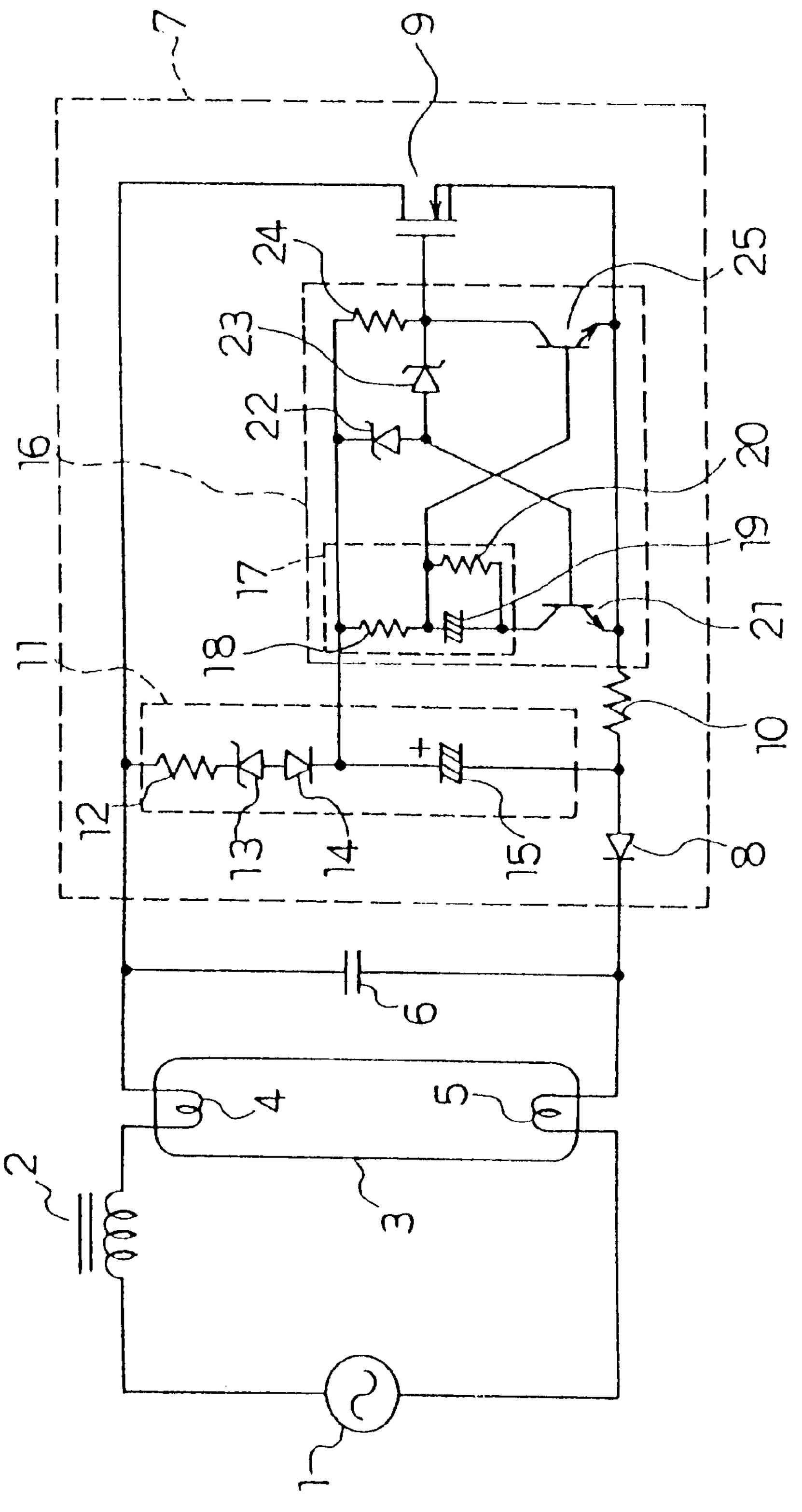
FIG. 1 is a drawing showing an example of a circuit configuration of a fluorescent lamp lighting device comprising a starting switch circuit according to an Embodiment of the present invention.

As shown in FIG. 1, a circuit of a fluorescent lamp lighting device provided with a starting switch circuit of the present invention comprises an a.c. power source 1, a ballast 2, a fluorescent lamp 3 including a pair of warm-up type electrodes 4, 5, a noise suppression capacitor 6, and a starting switch circuit 7. The circuit configuration of the fluorescent lamp lighting device is as follows. One end of the ballast 2 is connected to one end of the a.c. power source 1. The other end of the ballast 2 is connected to a power source side terminal of the electrode 4 of the fluorescent lamp 3. The other end of the a.c. power source 1 is connected to a power source side terminal of the electrode 5 of the fluorescent lamp 3. The starting switch circuit 7 and the noise suppression capacitor 6 are, respectively, connected between the starting switch circuit side terminals of the electrodes 4, 5 of the fluorescent lamp 3.

Intra-circuit configuration of the starting switch circuit 7 which is connected between the starting switch circuit side terminals of the electrodes 4, 5 of the fluorescent lamp 3 is as follows. The starting switch circuit 7 comprises a first rectifying element 8, a semiconductor switching element 9, a first resistor element 10, a first timer circuit 11, and control circuit 16. A series circuit consisting of the semiconductor switching element 9, e.q. a field effect transistor having an avalanche breakdown, the first resistor element 10 for detecting a current flowing through the semiconductor switching element 9, and the first rectifying element 8, is connected between the starting switch circuit side terminals of the electrodes 4, 5 of the fluorescent lamp 3. Use of the field effect transistor dispenses with a surge voltage suppression element for protecting the semiconductor switching element against a kick voltage. As the semiconductor switching element 9, beside the field effect transistor, a junction transistor may be used. The first timer circuit 11 is connected in parallel to a series circuit of the semiconductor switching element 9 and the first resistor element 10. The first timer circuit 11 is formed by serially connecting a resistor 12, a Zener diode 13, a diode 14 and a capacitor 15 to each other. A Zener voltage of the Zener diode 13 is set to be larger than a product of the sum of an ON-resistance of the semiconductor switching element 9 and a resistance of the first resistor element 10 and a warm-up current. The control circuit 16 is connected to both terminals of a series circuit of the capacitor 15 and the first resistor element 10 and is connected to the gate of the semiconductor switching element 9. The control circuit 16 comprises second timer circuit 17, a transistor 21, a transistor 25, a Zener diode 22, a Zener diode 23, and a resistor 24. A Zener voltage of the Zener diode 22 is set to be higher than a Zener voltage of the Zener diode 23. The second timer circuit 17 is formed by a series circuit of, a parallel circuit of a capacitor 19 and a resistor 20, and a resistor 18. One end of the resistor 18 of the second timer circuit 17, one end of the resistor 24 and the cathode of the Zener diode 22 are, respectively, connected to a connection point between the capacitor 15 and the diode 14. The base of the transistor 25 is connected to a connection point between the resistor 18 and the capacitor 19. For instance, voltage between the base and the emitter of the transistor 25 for making the transistor 25 to ON state is about 0.6 V. The collector of the transistor 21 is connected to one terminal of the parallel circuit of the capacitor 19 and the resistor 20 of the second timer circuit 17. The emitter of the transistor 21 is connected to a connection point between the first resistor element 10 and the source of the semiconductor switching element 9. The base of the transistor 21 is connected to the anode of the Zener diode 22 and the anode of the Zener diode 23. The anode of the Zener diode 22 is connected to the anode of the Zener diode 23. Other end of the resistor 24 is connected to the cathode of the Zener diode 23, the collector of the transistor 25 and the gate of the semiconductor switching element 9. The emitter of the transistor 25 is connected to the connection point between the first resistor element 10 and the source of the semiconductor switching element 9.

Figure 2:
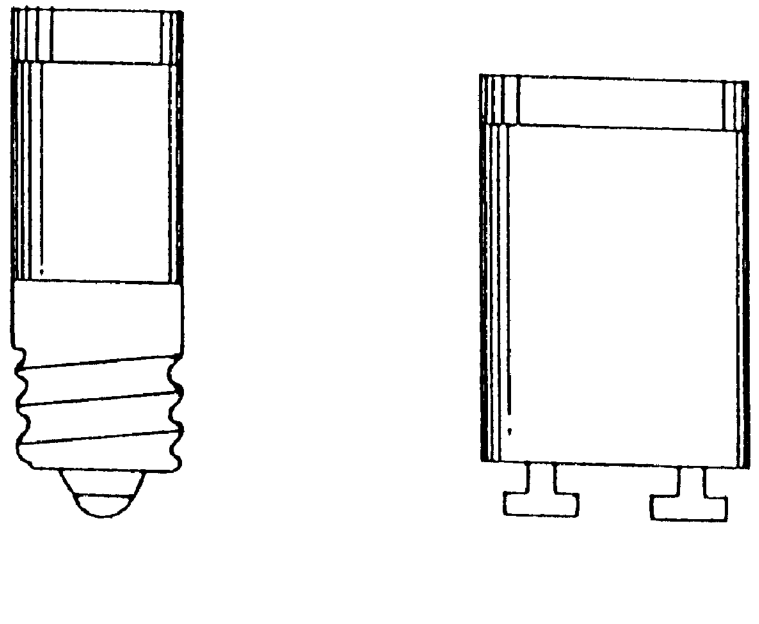
FIG. 2 is a drawing showing an appearance of the starting switch circuit of FIG. 1.

A container for the above-mentioned starting switch circuit is designed in a shape which is interchangeable with a glow starter as shown in FIG. 2. This makes application to a conventional fluorescent lamp possible.

Operation

Next, an operation of the fluorescent lamp lighting device shown in FIGS. 1 and 2 will be described with reference to FIGS. 3 to 5.

Figure 3:
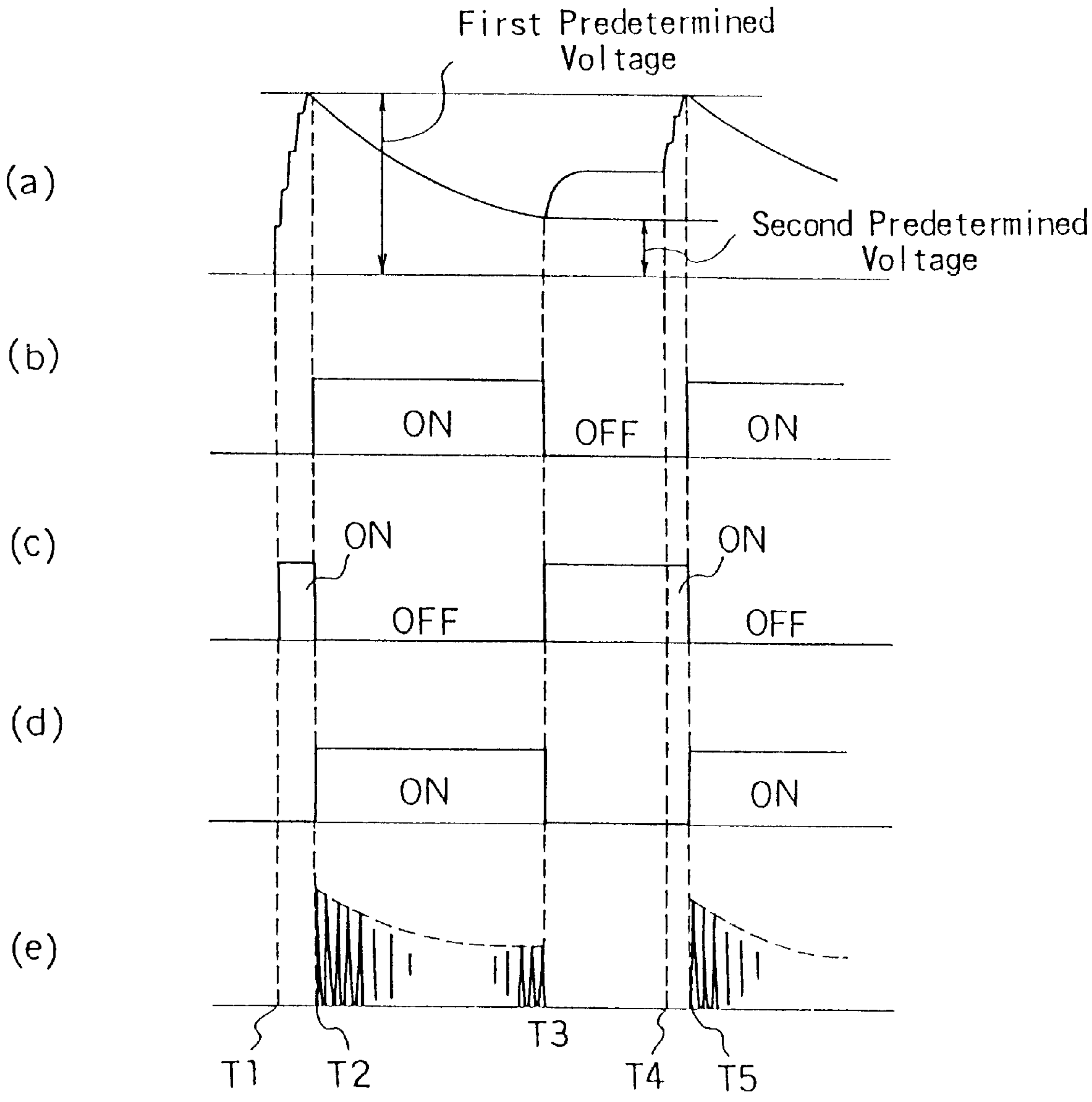
FIG. 3 is a drawing showing an operation of the fluorescent lamp lighting device of FIG. 1, and more precisely, (a) of FIG. 3 is a drawing showing a voltage across a capacitor 15, (b) of FIG. 3 is a drawing showing an operation condition of a transistor 21, (c) of FIG. 3 is a drawing showing an operation condition of a transistor 25, (d) of FIG. 3 is a drawing showing an operation condition of a semiconductor switching element 9, and (e) of FIG. 3 is a drawing showing a warm-up current.

Before the a.c. power source 1 is turned on, that is, prior to a time T1, a charge is not accumulated in the capacitor 15 and a voltage across the capacitor 15 is zero as shown in (a) of FIG. 3. Therefore, as shown in (b) and (c) of FIG. 3, the transistor 21 and the transistor 25 are in OFF state.

After the a.c. power source 1 is turned on at the time T1, during a positive cycle of the a.c. power source 1, a current flows to the capacitor 15 through the resistor 12, the Zener diode 13 and the diode 14, whereby a charge is accumulated in the capacitor 15. Since the diode 14 is disposed between the capacitor 15 and the Zener diode 13, the charge accumulated in the capacitor 15 is not discharged through the Zener diode 13 and the resistor 12.

At the same time, a current flows to the base of the transistor 25 through the resister 18, and the transistor 25 becomes to ON state as shown in (c) of FIG. 3.

Since a voltage across the Zener diode 22 is lower than the Zener voltage of the Zener diode 22, the base current to the base of the transistor 21 is blocked by the Zener diode 22. And in addition, since the transistor 25 is in ON state, the base current to the base of the transistor 21 is blocked by the Zener diode 23. Therefore, the transistor 21 remains in OFF state as shown in (b) of FIG. 3.

Since the transistor 21 is in OFF state, a charge is not accumulated in the capacitor 19 of the second timer circuit 17, and therefore, a voltage across the capacitor 19 is zero.

On the other hand, as shown in (a) of FIG. 3, a voltage across the capacitor 15 is quickly charged up by a half-wave a.c. current rectified by the diode 13 and reaches a first predetermined voltage which is the Zener voltage of the Zener diode 22.

In this example, a period from the time T1 to a time T2 is set in the range between 0.1 second and 0.2 second.

The voltage across the capacitor 15 reaches the first predetermined voltage at the time T2, and therefore, a current flows to the base of the transistor 21 through the capacitor 15 and the Zener diode 22, and the transistor 21 becomes to ON state as shown in (b) of FIG. 3.

When the transistor 21 becomes to ON state at the time T2, since the voltage at the capacitor 19 is zero, the base voltage of the transistor 25 becomes 0 V. This voltage is lower than such voltage for switching the transistor 25 to ON state, that is, about 0.6 V, and therefore, the transistor 25 becomes to OFF state as shown in (c) of FIG. 3.

When the transistor 25 becomes to OFF state at the time T2, since the voltage across the capacitor 15 is equal to or larger than the Zener voltage of the Zener diode 23, a base current is supplied to the base of the transistor 21 from the capacitor 15 through the resistor 24 and the Zener diode 23. Since the base current is supplied to the base of the transistor 21, as shown in (b) and (c) of FIG. 3, the transistor 21 remains in ON state and the transistor 25 remains in OFF state.

At this stage, a voltage at the gate of the semiconductor switching element 9 is approximately equal to the Zener voltage of the Zener diode 23, and hence, the semiconductor switching element 9 becomes to ON state as shown in (d) of FIG. 3.

When the semiconductor switching element 9 becomes to ON state, the warm-up current flows through the ballast 2, the electrode 4 of the fluorescent lamp 3, the semiconductor switching element 9, the first resistor element 10, the first rectifying element 8 and the electrode 5 of the fluorescent lamp 3, from the a.c. power source 1.

While the semiconductor switching element 9 is in ON state, a voltage across the starting switch circuit 7 is a product of the warm-up current and the sum of the ON-resistance of the semiconductor switching element 9 and the resistance of the first resistor element 10, namely, a few score V. Since the Zener voltage of the Zener diode 13 is set to be larger than the product of the warm-up current and the sum of the ON-resistance of the semiconductor switching element 9 and the resistance of the first resistor element 10, the current which flows to the capacitor 15 is blocked by the Zener diode 13.

The charge accumulated in the capacitor 15 is discharged through the second timer circuit 17 and the collector of the transistor 21, and is also discharged through the resistor 24, the Zener diode 23 and the base of the transistor 21. This gradually lowers the voltage across the capacitor 15.

When the voltage across the capacitor 15 lowers and reaches a second predetermined voltage which is the Zener voltage of the Zener diode 23, the base current which has been flowing from capacitor 15 to the base of the transistor 21 through the resistor 24 and the Zener diode 23 stops flowing. Therefore, the transistor 21 becomes to OFF state at a time T3 as shown in (b) of FIG. 3.

When the transistor 21 becomes to OFF state, the base current is supplied to the base of the transistor 25 from the capacitor 15 through the resistor 18, whereby the transistor 25 becomes to ON state and the gate voltage of the semiconductor switching element 9 becomes zero. Therefore, the semiconductor switching element 9 becomes to OFF state.

At this stage, since the warm-up current is rapidly blocked, a kick voltage due to the inductance of the ballast 2 is generated, and the fluorescent lamp 3 is ignited.

After the transistor 25 becomes to ON state, the base current to the base of the transistor 21 is blocked by the Zener diode 23. Hence, the transistor 21 remains in OFF state, so that the transistor 25 remains in ON state. As a result, the semiconductor switching element 9 remains in OFF state, and therefore, the fluorescent lamp 3 keeps lighting.

During the while the fluorescent lamp 3 is burning, a voltage across the fluorescent lamp 3 is sufficiently lower than the voltage of the a.c. power source 1, and therefore, the voltage across the capacitor 15 of the first timer circuit 11 never reaches the first predetermined voltage, and the transistor 21 remains in OFF state. Therefore, the semiconductor switching element 9 is not switched to ON state.

If the fluorescent lamp 3 goes off at a time T4 (See FIG. 3) due to a reduction in the power source voltage or the like, the voltage across the fluorescent lamp 3 becomes equal to the voltage of the a.c. power source 1. Thereby, the first timer circuit 11 operates again and performs the starting operation which is performed between the time T1 and the time T4, and therefore, the fluorescent lamp 3 is ignited once again.

In this example, a period of time which is necessary until the fluorescent lamp 3 is ignited is equal to the period between the time T1 and the time T3. The period between the time T1 and the time T2 is set in the range between 0.1 second and 0.2 second. Meanwhile, a warm-up time which is a period between the time T2 and the time T3 is determined as follows. The warm-up time is a period in which the warm-up current flows, and the warm-up time is determined mostly by a capacitance of the capacitor 15, a resistance of the resistor 18, a resistance of the resistor 24, the first predetermined voltage and the second predetermined voltage. Therefore, the warm-up time is almost constant, regardless of a warm-up current value which is dependent on a rated power value of the fluorescent lamp 3 and an impedance of the ballast 2.

Therefore, it is possible to use the same starting switch circuit for fluorescent lamp lighting devices which comprise ballast 2 and fluorescent lamp 3 which have different normal rated power.

In this example, in the case that the warm-up time of the fluorescent lamp is set in the range of 0.8 to 1.2 seconds, a steady starting capability is ensured for a fluorescent lamp having a rated power value within the wide range between 4 W and 30 W. In addition, when the a.c. power source 1 has a lower value than a rated value or the fluorescent lamp 3 is not easily ignited due to a low ambient temperature, the starting operation is repeated, and therefore, a steady starting capability is accordingly ensured.

An operation of the fluorescent lamp lighting device, when the fluorescent lamp lighting device is turned on, will be further described with reference to FIGS. 1 and 4.

Figure 4:
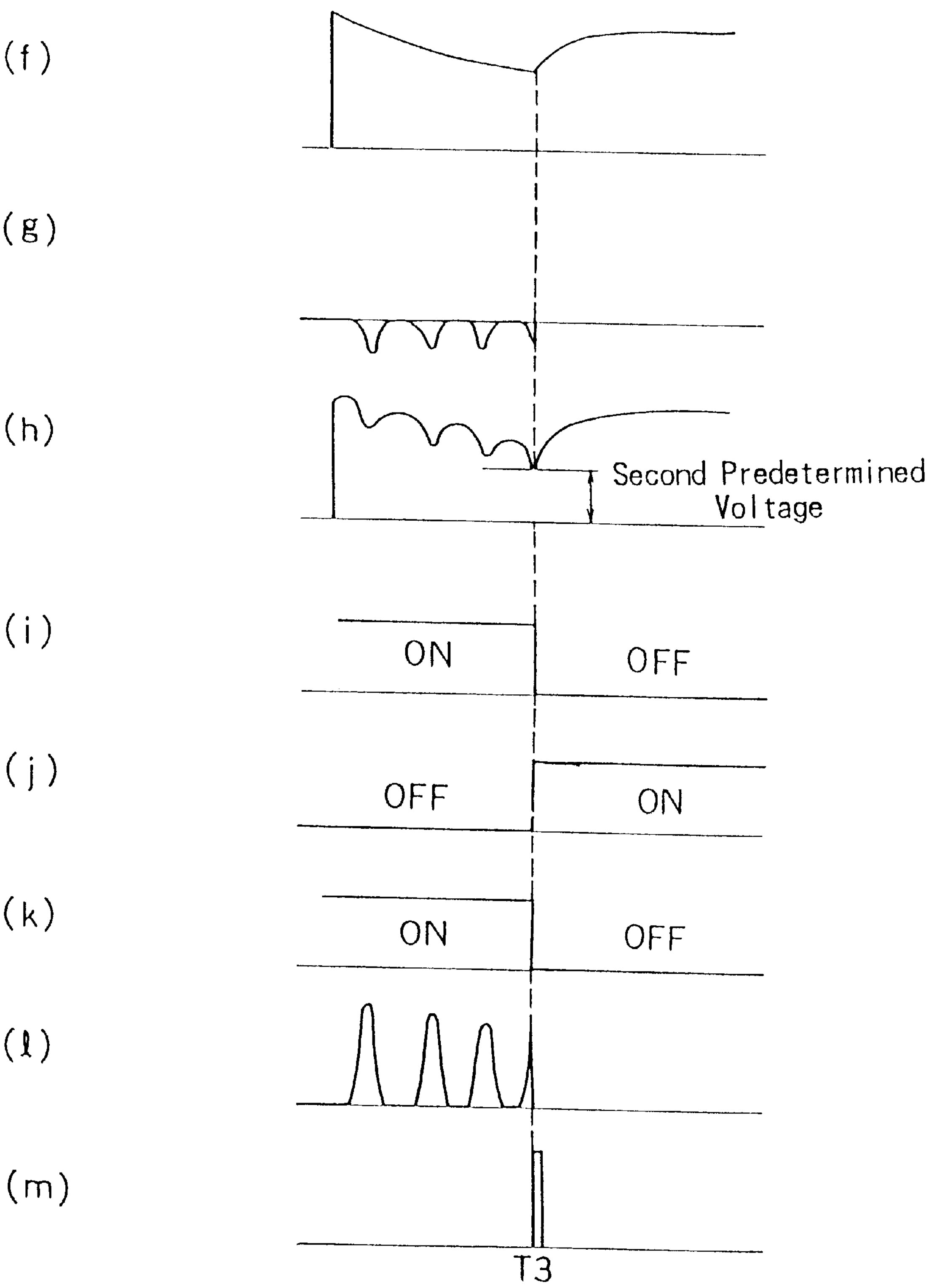
FIG. 4 is a drawing showing an operation of the fluorescent lamp lighting device of FIG. 1, and more precisely, (f) of FIG. 4 is a drawing showing a voltage across the capacitor 15, (g) of FIG. 4 is a drawing showing a voltage of a first resistor element 10 as viewed from the emitter of the transistor 21, (h) of FIG. 4 is a drawing showing a positive terminal voltage of the capacitor 15 as viewed from the emitter of the transistor 21, (i) of FIG. 4 is a drawing showing an operation condition of the transistor 21, (j) of FIG. 4 is a drawing showing an operation condition of the transistor 25, (k) of FIG. 4 is a drawing showing an operation condition of the semiconductor switching element 9, (l) of FIG. 4 is a drawing showing a warm-up current, and (m) of FIG. 4 is a drawing showing a kick voltage.
Figure 5:
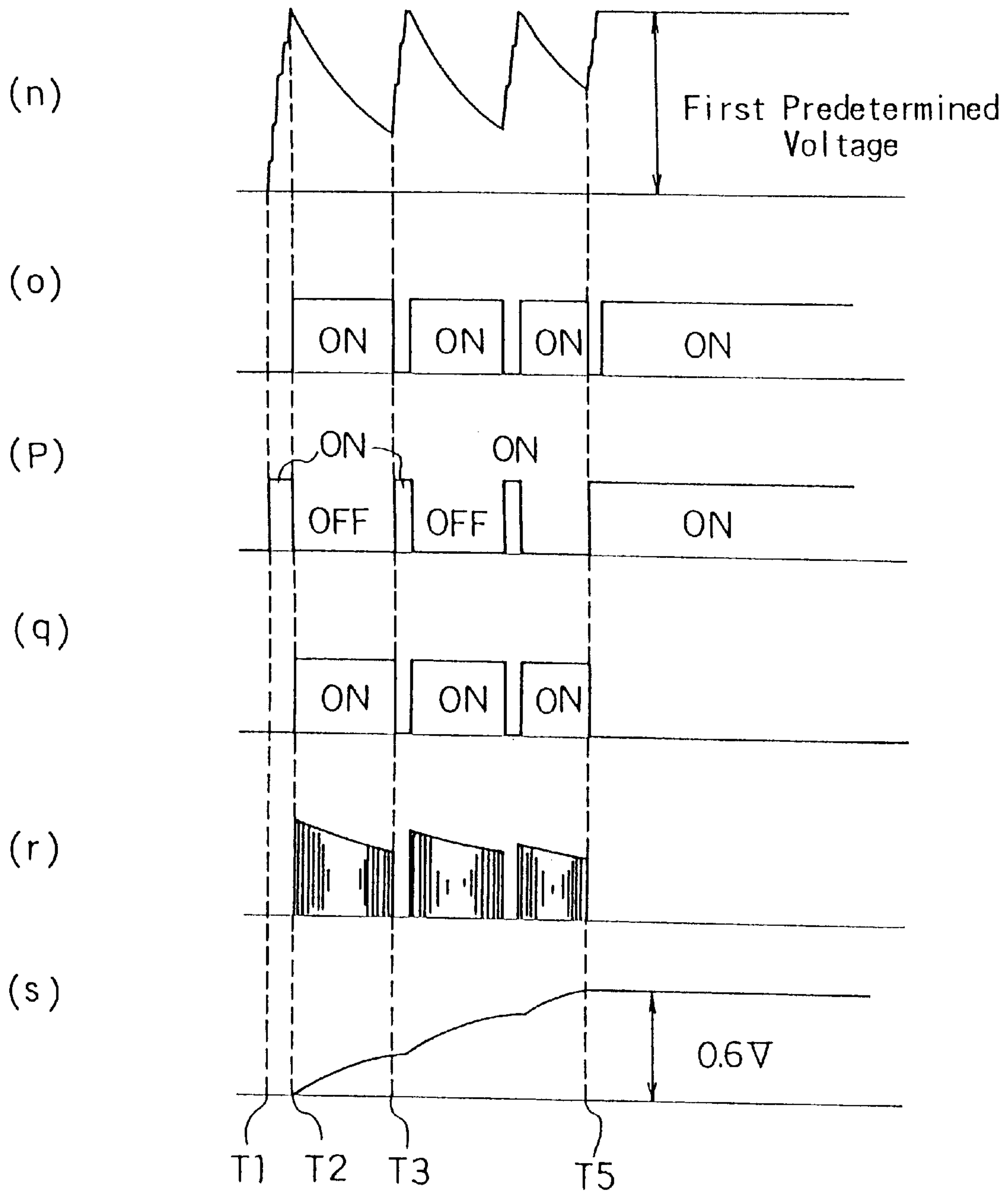
FIG. 5 is a drawing showing an operation of the fluorescent lamp lighting device of FIG. 1, and more precisely, (n) of FIG. 5 is a drawing showing a voltage across the capacitor 15, (o) of FIG. 5 is a drawing showing an operation condition of the transistor 21, (p) of FIG. 5 is a drawing showing an operation condition of the transistor 25, (q) of FIG. 5 is a drawing showing an operation condition of the semiconductor switching element 9, (r) of FIG. 5 is a drawing showing a warm-up current, and (s) of FIG. 5 is a drawing showing a voltage across a capacitor 19.
Figure 6:
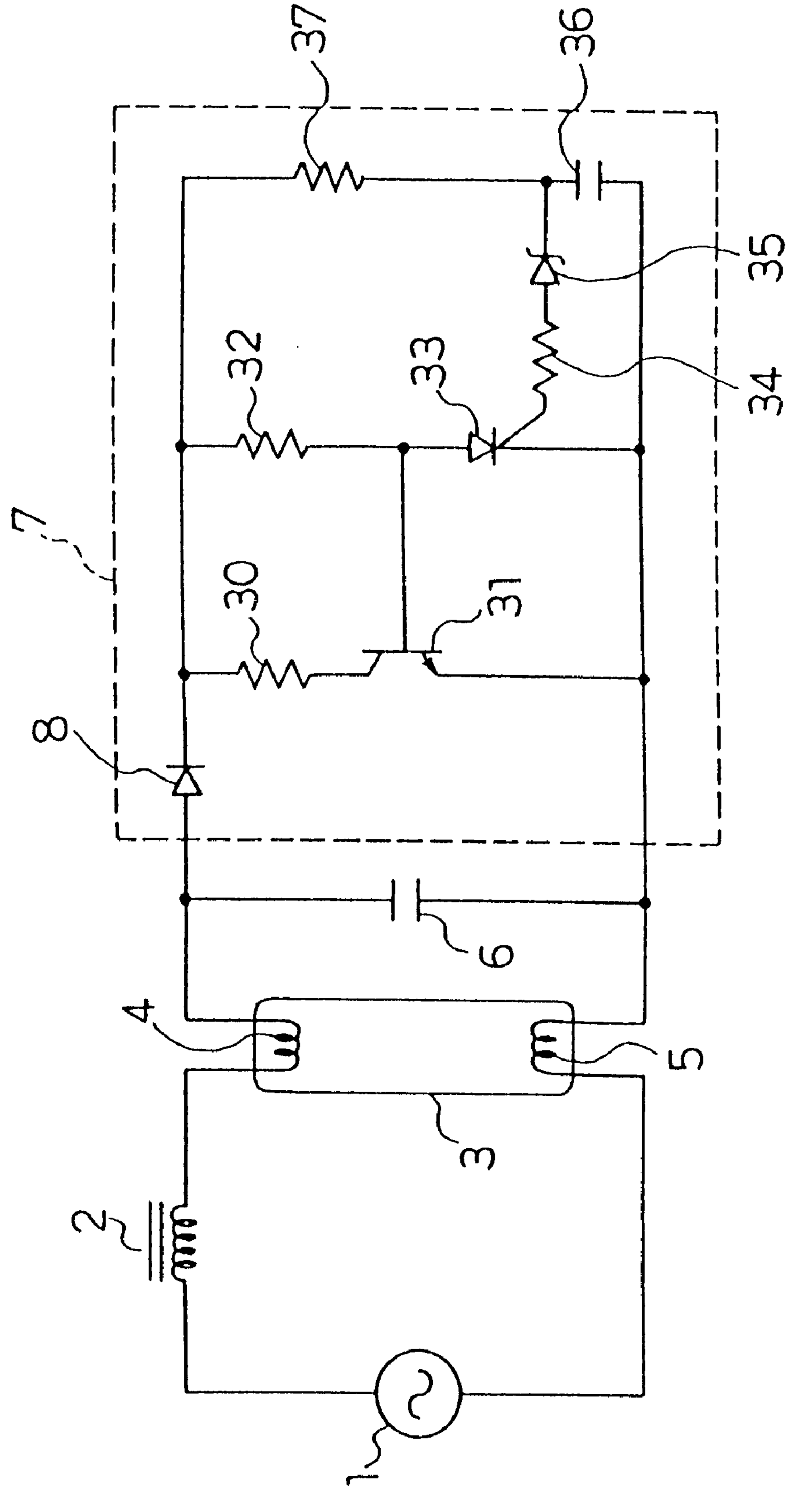
FIG. 6 PRIOR ART
FIG. 6 is a drawing showing a circuit configuration of a conventional fluorescent lamp lighting device.

FIG. 4 is a drawing expanding the time axis at the time T3 of FIG. 3.

When the semiconductor switching element 9 is in ON state and a warm-up current shown in (l) of FIG. 4 flows to the first resistor element 10, a voltage drop is generated across the first resistor element 10 due to the warm-up current. As shown in (g) of FIG. 4, the voltage across the first resistor element 10 has a negative polarity, as viewed from the emitter of the transistor 21. Further, a voltage at the positive polarity end of the capacitor 15 as viewed from the emitter of the transistor 21 is the sum of voltages shown in (f) and (g) of FIG. 4, which is a d.c. voltage with a ripple. This voltage has a reverse polarity to the warm-up current shown in (l) of FIG. 4, and becomes smaller as the warm-up current becomes larger. In the case that a voltage shown in (h) of FIG. 4 decreases due to discharging at the capacitor 15, this voltage always reaches the second predetermined voltage when the warm-up current is maximum or around the same.

At this moment, the base current which has been flowing from the capacitor 15 to the base of the transistor 21 through the resistor 24 and the Zener diode 2 instantaneously stops flowing, so that the transistor 21 becomes to OFF state at the time T3 as shown in (i) of FIG. 4. When the transistor 21 becomes to OFF state, the base current is supplied to the base of the transistor 25 from the capacitor 15 through the resistor 18, and therefore, the transistor 25 becomes to ON state. Therefore, the gate voltage of the semiconductor switching element 9 becomes zero and the semiconductor switching element 9 becomes to OFF state. At this stage, the warm-up current is cut off and a kick voltage due to the inductance of the ballast 2 is generated. Therefore, the fluorescent lamp 3 is ignited.

The value which the warm-up current is cut off is always almost a peak value and the kick voltage due to the ballast 2 is accordingly large, so that it is possible to ignite the fluorescent lamp 3 surely.

Next, a description will be given on an operation of the fluorescent lamp lighting device which is coming to the end of the lifetime or is defective, with reference to FIGS. 1 and 5.

An operation of the fluorescent lamp lighting device from the time T1 to the time T3 is similar to the operation of the normal fluorescent lamp lighting device, and therefore, the detail of the explanation will omit. When the a.c. power source 1 is turned on at the time T1, as shown in (r) of FIG. 5, the warm-up current flows and is thereafter cut off at the time T3, whereby a kick voltage due to the inductance of the ballast 2 is generated.

However, when the fluorescent lamp 3 is not ignited due to a defect or the like, the starting operation which is similar to that from the time T1 to the time T3 is repeated. For instance, while the semiconductor switching element 9 is in ON state as the period between the time T2 and the time T3, the warm-up current flows to the semiconductor switching element 9, the semiconductor switching element 9 generates heat because of a resistance loss due to the warm-up current, and the temperature of the semiconductor switching element 9 increases. In the meantime, the transistor 21 remains in ON state while the warm-up current flows. Since the transistor 21 is in ON state, a current flows to the capacitor 19 from the capacitor 15 through the resistor 18, so that the capacitor 19 is charged up and a voltage across the capacitor 19 increases.

After the starting operation which is similar to that from the time T1 to the time T3 is repeated, at a time T5, the voltage at the capacitor 19 reaches 0.6 V, which is the voltage between the base and the emitter for switching the transistor 25 to ON state. Therefore, the current which has been flowing to the capacitor 19 from the capacitor 15 through the resistor 18 substantially stops flowing. The base current starts flowing to the base of the transistor 25 through the resistor 18, whereby the transistor 25 becomes to ON state. When the transistor 25 becomes to ON state, the semiconductor switching element 9 becomes to OFF state, the warm-up current stop flowing substantially, and the starting operation is stopped. After the warm-up current stops flowing, due to the voltage of the a.c. power source 1, the voltage across the capacitor 15 reaches the first predetermined voltage, and the transistor 21 becomes to ON state. However, since the voltage across the capacitor 19 is already 0.6 V, the transistor 25 is not switched to OFF state but remains in ON state.

As a result, the voltage across the capacitor 15 remains at the first predetermined voltage, the voltage across the capacitor 19 remains at 0.6 V, the transistor 21 and the transistor 25 remain in ON state, and the semiconductor switching element 9 remains in OFF state.

Therefore, even when the lamp comes to the end of the lifetime, unlike a conventional glow starter, the lamp does not flicker.

When the a.c. power source 1 is turned off following this, the charge accumulated in the capacitor 15 is gradually discharged through the resistor 18 and through the resistor 24. The charge accumulated in the capacitor 19 is gradually discharged through the resistor 20. As a result, the initial condition prior to turning on of the a.c. power source 1 is recovered.

A period between the time T2 and the time T5 in which the starting operation is stopped is generally determined by a time constant of the capacitor 19 and the resistor 18. Since an increase in the temperature of the semiconductor switching element 9 is beforehand set to be within the range of the rated value, even in the case that a fluorescent lamp which is coming to the end of the lifetime or a defective fluorescent lamp is used, it is possible to surely terminate the warm-up current without destroying the semiconductor switching element 9. In this example, the period between the time T2 and the time T5 is set to be 3 seconds or shorter, and the semiconductor switching element 9 is protected against generation of heat.

Use of the second timer circuit stops re-turning on of the lamp, prevents the lamp from flickering, and protects the semiconductor switching element in case of lifetime of lamp.

What is claimed is:

1. A starting switch circuit for starting a fluorescent lamp comprising:

a first circuit having first rectifying means, a semiconductor switching element including a control terminal, and first resistor means for detecting a current flowing to said semiconductor switching element;

first timer means, connected in parallel to a series circuit of said semiconductor switching element and said first resistor means, for switching said semiconductor switching element to OFF state after said semiconductor switching element is in ON state for a predetermined period of time; and control means for controlling said semiconductor switching element, wherein said circuit is capable of starting a fluorescent lamp and wherein substantially no current flows through said starting switch circuit after said fluorescent lamp has been started.

2. The starting switch circuit of claim 1, wherein said first timer means comprises second resistor means, at least one Zener diode, rectifying means and a capacitor.

3. The starting switch circuit of claim 1, wherein said semiconductor switching element is a field effect transistor.

4. The starting switch circuit of claim 1, wherein said control means comprises second timer means for maintaining said semiconductor switching element in OFF state after a predetermined period of time in the case that operation for switching said semiconductor switching element to ON state is repeated.

5. The starting switch circuit of claim 1, wherein said starting switch circuit is contained in a container which is interchangeable with a conventional glow starter of a fluorescent lamp apparatus.

6. A fluorescent lamp lighting device comprising:

an a.c. power source;

a ballast connected at its one end to one end of said a.c. power source;

a fluorescent lamp with warm-up electrodes connected to its one terminal to the other end of said ballast and at its another terminal to the other end of said a.c. power source; and the starting switch circuit of claim 1 connected at its one end to still another terminal of said fluorescent lamp and at the other end thereof to still another terminal of said fluorescent lamp.

7. The starting switch circuit of claim 1, wherein in a first mode said circuit is adapted for starting a fluorescent lamp, wherein in a second mode said circuit is adapted for allowing the uninterupted operation of the fluorescent lamp, and wherein said circuit does not operate to turn off the fluorescent lamp.

8. A fluorescent lamp starter comprising:

a control circuit for controlling a transistor;

a first timer circuit comprising a resistor, a diode, and a capacitor, operatively connected to said control circuit;

a second timer circuit comprising a plurality of resistors and a capacitor, operatively connected to said control circuit and to said first timer, wherein said control circuit activates said transistor to enable a warm-up current and deactivates said transistor to enable a kick voltage, in response to signals from said first and second timers.

9. A fluorescent lamp lighting device comprising:

an a.c. power source;

a ballast connected at its one end to one end of said a.c. power source;

a fluorescent lamp with warm-up electrodes connected to its one terminal to the other end of said ballast and at its another terminal to the other end of said a.c. power source; and the starting switch circuit of claim 2 connected at its one end to still another terminal of said fluorescent lamp and at the other end thereof to still another terminal of said fluorescent lamp.

10. A fluorescent lamp lighting device comprising:

an a.c. power source;

a ballast connected at its one end to one end of said a.c. power source;

a fluorescent lamp with warm-up electrodes connected to its one terminal to the other end of said ballast and at its another terminal to the other end of said a.c. power source; and the starting switch circuit of claim 3 connected at its one end to still another terminal of said fluorescent lamp and at the other end thereof to still another terminal of said fluorescent lamp.

11. A fluorescent lamp lighting device comprising:

an a.c. power source;

a ballast connected at its one end to one end of said a.c. power source;

a fluorescent lamp with warm-up electrodes connected to its one terminal to the other end of said ballast and at its another terminal to the other end of said a.c. power source; and the starting switch circuit of claim 4 connected at its one end to still another terminal of said fluorescent lamp and at the other end thereof to still another terminal of said fluorescent lamp.

12. A fluorescent lamp lighting device comprising:

an a.c. power source;

a ballast connected at its one end to one end of said a.c. power source;

a fluorescent lamp with warm-up electrodes connected to its one terminal to the other end of said ballast and at its another terminal to the other end of said a.c. power source; and the starting switch circuit of claim 5 connected at its one end to still another terminal of said fluorescent lamp and at the other end thereof to still another terminal of said fluorescent lamp.

* * * * *